United States Patent [19]
Czerwinski

[11] 3,745,932
[45] July 17, 1973

[54] CONVEYOR FOR VEHICLE WASHING UNIT

[76] Inventor: Gerald E. Czerwinski, 2532 Buchanan Road, Kenosha, Wis. 53140

[22] Filed: June 23, 1971

[21] Appl. No.: 155,879

[52] U.S. Cl. .............................................. 104/172 B
[51] Int. Cl. ....................... B61b 13/12, B65g 19/22
[58] Field of Search .................. 104/172 B; 198/170

[56] References Cited
UNITED STATES PATENTS
| | | | |
|---|---|---|---|
| 3,554,132 | 1/1971 | Hanna | 104/172 B |
| 3,196,806 | 7/1965 | Brunder | 104/172 B |
| 3,526,193 | 9/1970 | Vani | 104/172 B |

Primary Examiner—Drayton E. Hoffman
Attorney—Andrus, Sceales, Starke & Sawall

[57] ABSTRACT

A conveyor for a vehicle washing system. The conveyor includes an endless chain located above grade level so that both the conveying path of the chain and the return path move in a common horizontal plane. A series of roller units are attached at spaced intervals to the chain and are adapted to engage the tire of a vehicle to convey the vehicle through the washing unit. A provision is made at the entrance end of the conveyor for enabling the roller units to selectively by-pass the vehicle tire. As each roller unit passes around the sprocket at the end of the conveyor, it pivots downwardly to a lower level and rides at the lower level beneath the tire to by-pass the same. When it is desired to have the roller unit engage the vehicle tire, a ramp or plate is pivoted upwardly and the roller unit will ride upwardly on the ramp to the upper level in position to engage the tire and convey the vehicle through the washing unit.

14 Claims, 12 Drawing Figures

INVENTOR.
GERALD E. CZERWINSKI
BY
Andrus, Sceales, Starke & Sawall
Attorneys

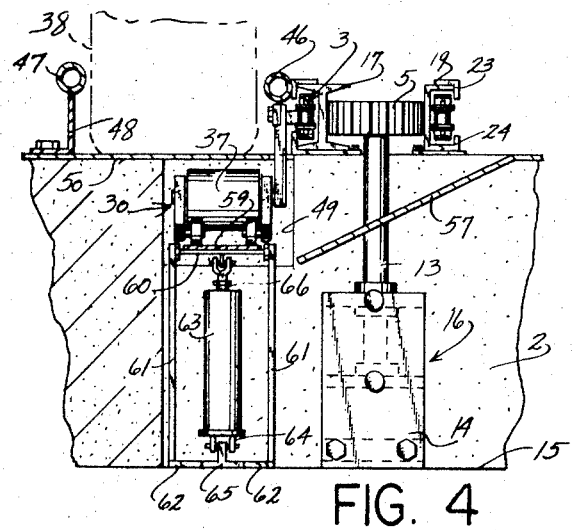
FIG. 4
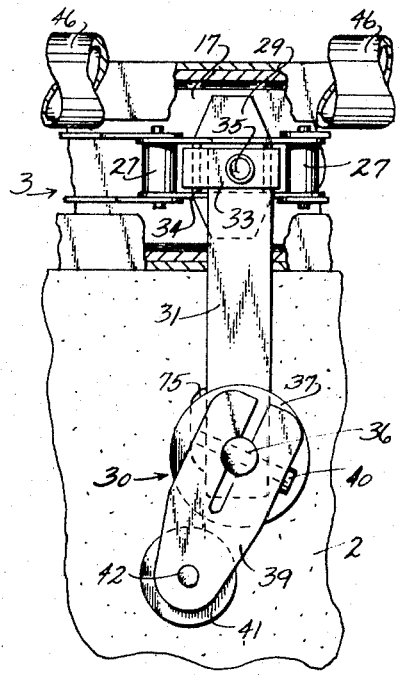
FIG. 6
FIG. 5
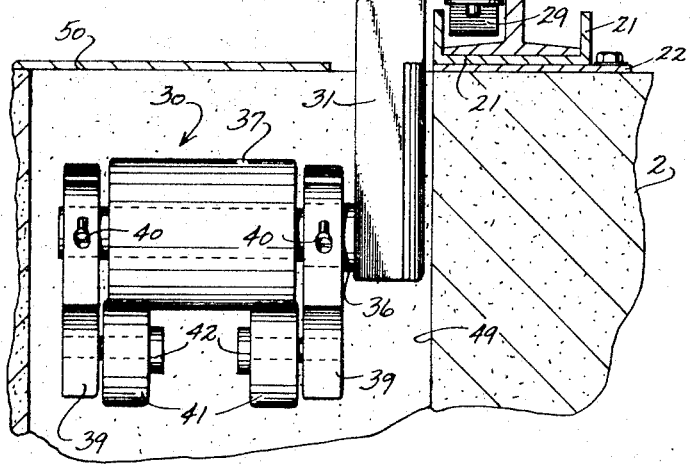
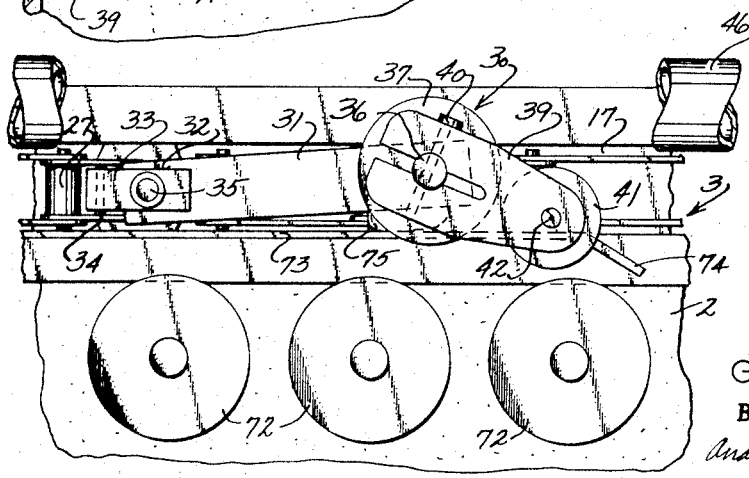
FIG. 12
INVENTOR.
GERALD E. CZERWINSKI
Attorneys

INVENTOR.
GERALD E. CZERWINSKI

BY

Attorneys

CONVEYOR FOR VEHICLE WASHING UNIT

BACKGROUND OF INVENTION

The conventional vehicle washing system includes a conveyor which serves to move the automobile, or other vehicle, through the washing unit. The conveyor usually consists of an endless chain, and in some installations, the chain is mounted above grade level so that both the conveying path and the return path of the chain are located in the same horizontal plane. In other installations, the return path of travel of the chain is located within a trough at a level beneath grade.

Several methods can be employed to attach the vehicle to the endless chain. In some cases a short length of chain is hooked between the conveyor chain and the frame or bumper of the vehicle, while in more recent installations, roller units are connected at spaced intervals to the chain and engage the tire of the vehicle to move the vehicle to the washing unit. The use of conveyor rollers has decided advantages over the use of short lengths of connecting chain, because no labor is required to engage and disengage the vehicle from the conveyor chain and there is no possibility of damage to the bumper or other frame members, or to the vehicle transmission, as may occasionally arise when using small lengths of connecting chain.

In a typical vehicle washing unit, the operator of the vehicle will drive to a vacuuming station where an attendant will vacuum the interior of the vehicle. Following the vacuuming, the attendant will normally enter the car and move the car slightly ahead onto the conveyor system so that a roller unit attached to the conveyor can engage the front tire of the vehicle to thereby move the vehicle through the washing unit. This procedure has disadvantages in that it requires time for the attendant to get in the vehicle, start it and move it ahead onto the conveyor. While the time required for each such individual operation is relatively small, the accumulated time, over a period of a day, is considerable. Moreover, the owners of the automobile or vehicle do not favor the idea of an attendant starting and operating their vehicle. As a further problem, the attendant may occasionally have problems in starting or operating the vehicle, particularly where the vehicle may not be a popular make.

SUMMARY OF INVENTION

This invention relates to a conveyor for a vehicle washing system and more particularly to a conveyor utilizing roller units which eliminates the problems associated with conveyors of the prior art. According to the ivention, the conveyor includes an endless chain which is located above grade level so that both the conveying path of the chain and the return path move by-pass a common horizontal plane. A series of roller units are pivotally attached at spaced intervals to the chain and are adapted to engage the tire of the vehicle and convey the vehicle through the washing unit.

In accordance with a feature of the invention, a provision is made at the entry end of the conveyor to selectively enable each roller unit to bypass the vehicle tire. As each roller unit passes around the sprocket at the entry end of the conveyor, it pivots downwardly to a lower level and rides at this lower level beneath the tire to by-pass the same. When it is desired to move the vehicle through the washing unit, a ramp plate is pivoted upwardly through operation of a fluid cylinder and the roller unit rides up the ramp to the upper level in position to engage the vehicle tire and convey the vehicle through the washing unit.

The by-pass provision for the roller unit enables the operator or owner of the vehicle to drive the vehicle, directly onto the conveyor system, and the roller units will then by-pass the vehicle tire during the period while the attendant is vacuuming the car. After the vacuuming has been completed, the attendant will then actuate the fluid cylinder to move the ramp upwardly so that the next roller unit will ride up the inclined ramp and engage the tire to move the vehicle through the unit. The construction saves time in that the attendant is not required, after vacuuming, to enter the vehicle and move it ahead onto the conveyor. It also saves customer aggravation due to the fact that the attendant is not required to operate the vehicle.

As the entire conveyor chain is installed above ground, the unit can be installed with either new or existing installations with a minimum of labor and expense.

Other objects and advantages will appear in the course of the following description.

The drawings illustrate the best mode presently contemplated of carrying out the invention.

In the drawings:

FIG. 4 is an enlarged transverse section taken along line 4—4 of FIG. 1;

FIG. 5 is a vertical section taken along line 5—5 of FIG. 1 and showing a roller unit in the lower or by-pass position;

FIG. 6 is a side elevation of the structure shown in FIG. 5;

FIG. 12 is a partial side elevation of the conveyor showing a roller unit elevated above the tire rotating rollers.

Figure 1:
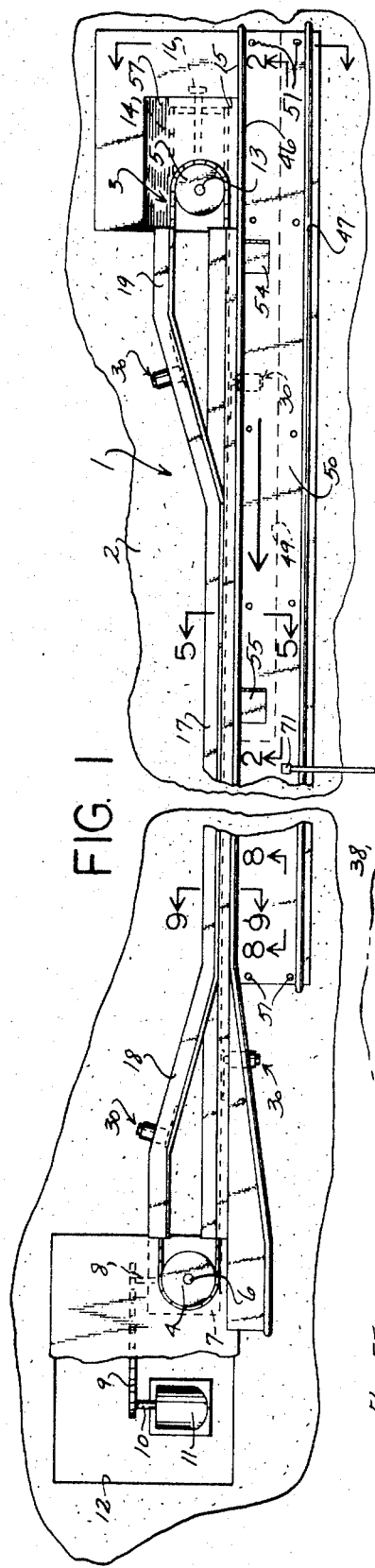
FIG. 1 is a plan view of the conveyor system of the invention as utilized with a conventional vehicle washing unit.

FIG. 1 illustrates schematically the conveyor of the invention as utilized in a typical vehicle washing unit. The conveyor 1 is mounted on the floor or foundation 2 and includes an endless chain 3 which is trained over a drive sprocket 4 and an idler sprocket 5.

The drive sprocket 4 is mounted on a vertical output shaft 6 of transmission or gear box 7, while the input shaft 8 to the gear box 7 is connected by a conventional variable speed belt drive 9 to the drive shaft 10 of a motor 11. Both the transmission 7 and the motor 11 are mounted within a generally rectangular pit 12 located at the exit end of the conveyor.

Idler sprocket 5 is carried on a vertical shaft 13 which is journalled for rotation by bearings in a frame 14 that is mounted within a pit 15 located at the entrance end of the wash unit. A conventional threaded take-up unit, indicated generally by 16, is associated with the shaft bearings to take up the slack in the conveyor chain 3 and maintain the desired tension on the chain.

The conveyor chain 3 is guided in travel by an I-beam 17, with the conveying path of the chain moving along one side of the vertical web of the I-beam and the return path of travel moving on the opposite side of the vertical web. With this construction, both the conveying path of travel and the return path of the chain are located above grade level and lie in a common horizontal plane. To aid in guiding the conveyor chain 3 from the drive sprocket 4 to the I-beam 17, a guide channel 18 is connected between the I-beam and extends diagonally outward and terminates adjacent the sprocket 4. Similarly, a guide channel 19 extends diagonally from the I-beam 17 at the entry end of the conveyor and terminates adjacent the idler sprocket 5 and aids in guiding the conveyor chain around the idler sprocket.

As best illustrated in FIG. 5, angles 20 are welded to the upper flange of the I-beam 17, and the vertical flanges of the angles extend downwardly. Similarly, angles 21 are welded to the lower flange of the I-beam and the vertical flanges of the angles 21 extend upwardly. Thus, the angles 20 and 21 in combination with the flanges and vertical web of the I-beam provide tracks for travel of the conveyor chain 3.

As shown in FIG. 5, the angles 21 are welded to a base plate 22 which in turn is bolted to the floor or foundation 2.

To guide the chain in travel within the channels 18 and 19, angles 23 and 24 are welded to the upper and lower flanges of each channel and function with the respective channel to provide a track for movement of the chain 3. The use of the I-beam 17 as a track for both the conveying path and return path of chain 3, provides a more compact unit, having a minimum width, which can be more readily accommodated in existing buildings.

Figure 7:
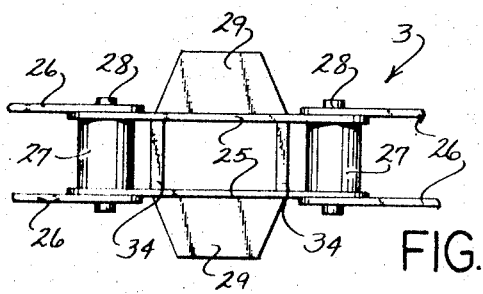
FIG. 7 is a side elevation of the conveyor chain.

The chain 3 is a conventional roller link chain composed of a series of links 25 and 26, as shown in FIG. 7. Rollers 27 are secured between the corresponding ends of the links 25 and the links 25 and 26 are connected together by pins 28 that extend through rollers 27. Ears or lugs 29 are formed on the upper and lower surfaces of the links 25 and serve as wear projections, rinding against the flanges of the I-beam 17 as the chain 3 moves in its path of travel.

Figure 9:
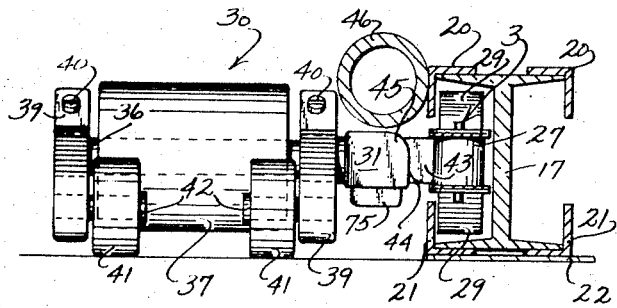
FIG. 9 is a section taken along line 9—9 of FIG. 8.
Figure 8:
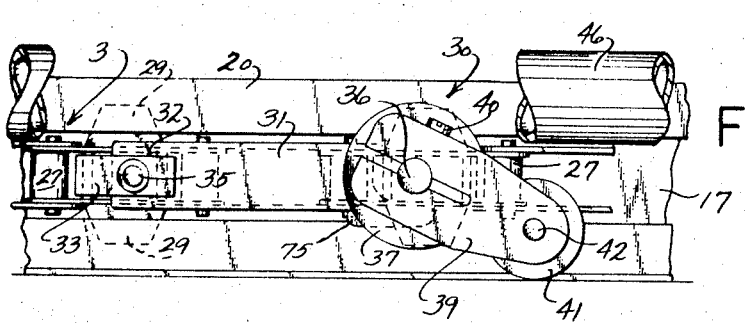
FIG. 8 is a section taken along line 8—8 of FIG. 1 and showing a roller unit in the upper conveying position.
Figure 10:
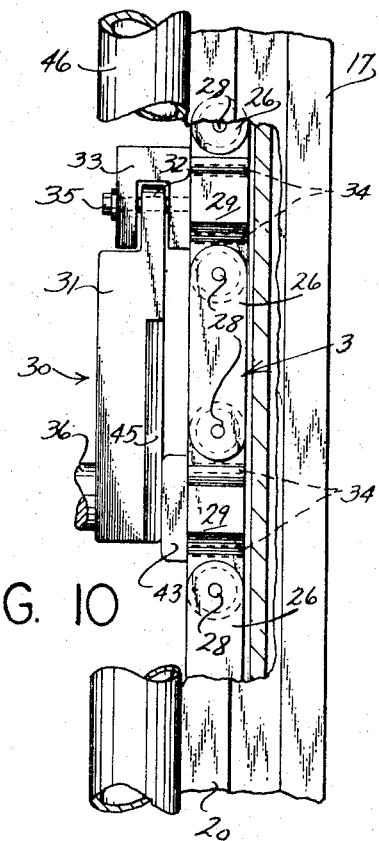
FIG. 10 is a top view of the structure shown in FIG 8.
Figure 11:
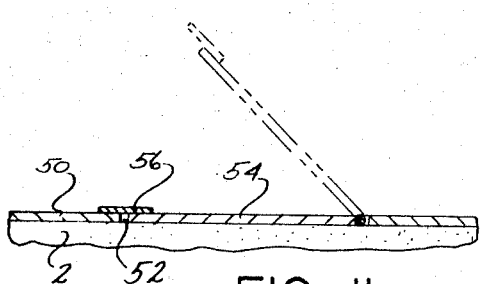
FIG. 11 is a section showing the hinged door.

A series of roller units 30 are attached at spaced intervals alon the length of the conveyor chain 3 and serve to move the vehicle through the washing unit. As illustrated in FIGS. 5, 9 and 10, each roller unit 30 includes an arm 31 which is pivotally connected to the chain 3. The upper end 32 of the arm is pivotally connected within a slot formed in a lug 33 welded to the edges of plates 34 that extend vertically between a pair of links 25. A bolt 35 extends through aligned openings in the outer flange of lug 33 and end 32 of the arm and is threaded into the inner portion of the lug. This connection permits the arm 31 to pivot with respect to the chain 3 in a vertical plane.

A horizontal shaft 36 is mounted on the lower end of each arm 31 and a large roller 37 is journalled on the central portion of the shaft. Mounted on either side of the roller 37 are links 39 which are connected to the shaft 36 by bolts 40, so that links 39 are fixed with respect to arm 31 and are located at an obtuse angle with respect to the arm. Rollers 41 are mounted for rotation on the lower ends of the links 39 by bolts 42. Bolts 42 extend through bushings within the rollers 41 and the ends of the bolts are threaded within the links 39.

As the chain 3 moves in its forward or conveying path of travel, the rollers 41 ride on the floor or foundation 2 and the roller 37 engages the tire 38 and conveys the vehicle through the washing unit.

When the roller unit 30 is in its upper position, the arm 31 is substantially parallel with the conveyor chain 3, and to prevent lateral deflection of the arm, a pad 43 is welded to plates 34 on links 25 of the chain and is provided with a rounded or curved lower edge 44, as shown in FIGS. 9 and 10. The upper edge 45 on arm 31 is correspondingly rounded so that the edge 45 will ride against the rounded surface 44 of pad 43 when the arm can is pivoted upwardly to the horizontal position. When in the upper position, the pad 43 will engage the inner surface of the arm 31 and prevent inward deflection of the roller unit 30 as the roller 37 bears against the tire 38 of the vehicle.

To guide the vehicle tire 38 in movement, a pipe 46 is welded to the top angle 20 on the I-beam 17 as illustrated in FIGS. 4 and 5, and the oute edge of the pipe projects beyond the arm 31 so that the tire will contact the pipe 46 before contacting the arm 31. A guide pipe 47 is also mounted in spaced relation to the guide pipe 46 and is supported by brackets 48 from the foundation 2. The spacing between the pipes 46 and 47 is slightly greater than the width of the vehicle tire 38, as shown in FIG. 4.

In accordance with the invention, the pit 15 is provided with an extension 49 which extends forwardly and has a lesser depth than the pit 15. The top of the pit extension 49 is enclosed by a flat plate 50 which is secured to the upper surface of the floor 2 by bolts 51 and projects over the pit extension 49.

Figure 2:
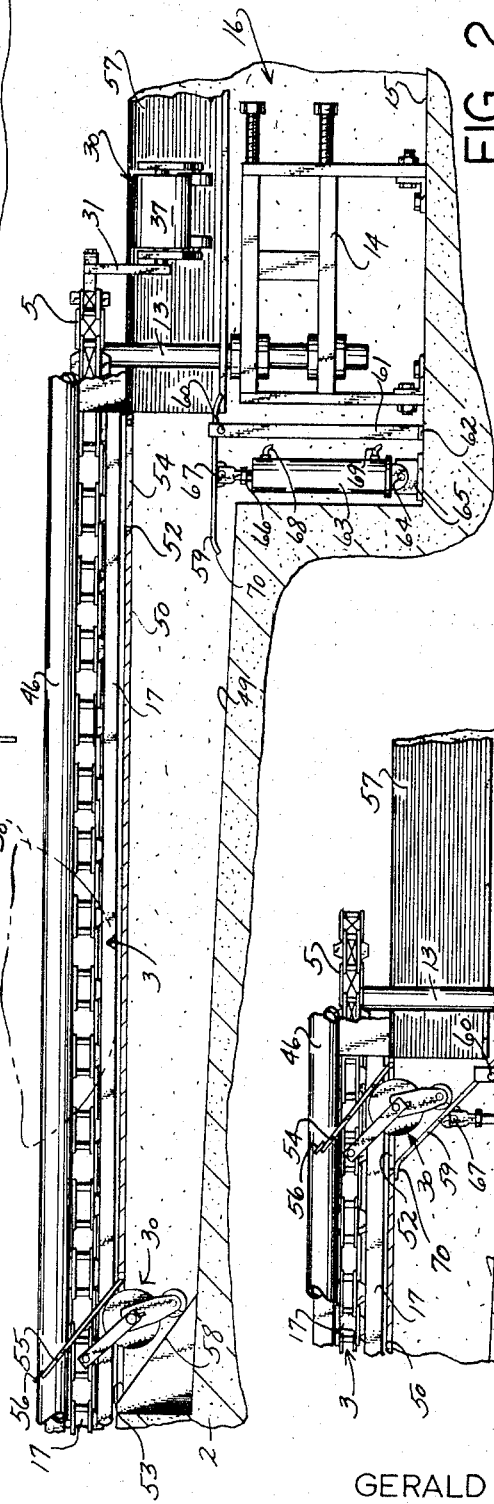
FIG. 2 is an enlarged partial vertical section taken along line 2—2 of FIG. 1 and showing the ramp in the down position and the roller units moving in the lower or bypass path.

As best shown in FIG. 2, th eplate 50 is provided with a pair of openings 52 and 53, each of which is enclosed by hinged doors 54 and 55; respectively. Stops 56 are welded to the upper surface of the doors 54 and 55 and are adapted to engage the upper surface of the plate 50 to prevent the doors from falling through the openings 52 and 53.

As each roller unit 30 passes around the sprocket 5, the rollers 41 ride downwardly on an inclined plate 57, thereby permitting the arm 31 to pivot downwardly a substantially vertical position and moving the roller 37 to a position below the foundation 2. The roller 37 then travels beneath the plate 50, as illustrated in FIG. 2, to the forward end of the pit extension 49. As shown in FIG. 5, the inner edge of the plate 50 is spaced from the I-beam 17 so that the arm 31 can travel within the clearance between the edge of the plate and the I-beam.

Figure 3:
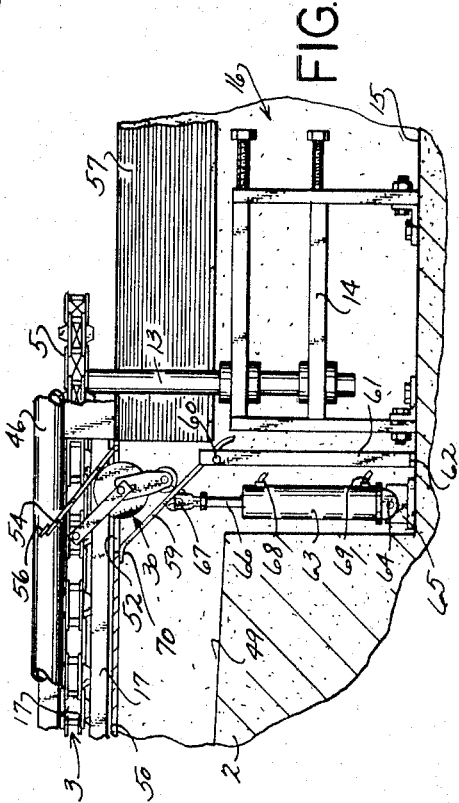
FIG. 3 is a view similar to FIG. 2 showing the ramp in the upper position and the roller units moving to the upper position.

The roller 37 is moved upwardly to a position above the plate 50 at the forward end of the pit extension 49 by an inclined plate 58. When the roller unit 30 reaches the end of the pit extension 49 in its travel beneath the plate 50, the rollers 41 ride on the inclined plate 58, causing the roller 37 to move upwardly and engage the hinged door 55, thereby opening the door and permitting the roller 37 to move through the opening 53 and back onto the surface of the floor 2. The travel of the roller 37 beneath the plate 50, which supports the tire 38 of the vehicle to be washed, provides a by-pass enabling the roller to by-pass the tire. In order to move the roller 37 of roller unit 30 into engagement with the vehicle tire 38, which is located on the plate 50, a pivotable plate 59 is located within the rear end of the pit extension 49 and generally beneath the opening 52, as shown in FIGS. 2 and 3. The rear end of the plate 59 is attached to a horizontal shaft 60, the ends of which are journalled in columns 61 that extend upwardly from the bottom of the pit 15. The lower ends of the columns 61 are supported on a base plate 62.

The plate 59 is adapted to be pivoted between a generally horizontal position and an upwardly inclined position by a fluid cylinder 63. The lower end of the cylinder is provided with lugs 64 which are pivotally connected to a bracket 65 mounted on the bottom of the pit 15. A piston rod 66 is mounted for sliding movement in the cylinder 63 and the outer end of the piston rod is pivotally connected to a lug 67 mounted on the undersurface of the plate 59. A fluid pressure medium, such as air or oil, is introduced and withdrawn from the ends of the cylinder through lines 68 and 69. When the fluid is introduced into the lower end of the cylinder through line 69, the piston rod 66 will be extended to thereby pivot the plate 59 to an upwardly inclined position so that the outer bent end 70 of the plate engages the undersurface of the plate 50 adjacent the forward edge of the opening 52. With the plate in the inclined position, the next roller 37 passing around the sprocket 5 will ride up the inclined plate 59 to the upper surface of plate 50, forcing the hinge door 54 open as it moves upwardly through the openings 52. The roller 37 will then move across the upper surface of the plate 50 to engage the vehicle tire 38 and move the vehicle through the car washing unit.

When the vehicle has moved a predetermined distance beyond the plate 50, the forward end of the vehicle will engage a limit switch 71 which actuates valving, not shown, to introduce fluid into the upper end of cylinder 63 through line 68, thereby retracting the piston rod 66 and moving the plate 59 back to its original, generally horizontal, position. With the plate 59 in the horizontal position, the next roller 37 moving around the sprocket 5 will again be by-aassed beneath the plate 50 so that it will not engage a vehicle tire 38 located on the plate 50, if the tire is in that position.

FIG. 12 illustrates a feature of the invention in which each roller unit 30 is elevated so that it will not engage or interfere with a series of driven rollers 72 which are utilized with the wheel washing mechanism. As shown in FIG. 12, a series of driven rollers 72 are mounted transverse to the path of travel of the conveyor chain, and are generally flush with the upper surface of the foundation 2. As the tire 38, being conveyed by roller 37, moves onto the driven rollers 72, it is driven at a rapid rate of speed so that a tire washing brush, not shown, can engage and clean the white side walls of the tire during this rapid movement.

To elevate the roller unit 30 above the level of rollers 72, a guide 73 is secured to the lower angle 21 on the I-beam 17 and is provided with downwardly bent ends 74. As each roller unit 30 approaches the driven rollers 71, the arm 31 will ride upwardly on the guide plate 73 to thereby elevate the roller 37 and rollers 41 to a position where they will not contact or interfere with the driven rollers 72. A pad 75 is welded to the arm 31 and is adapted to ride on the guide plate 73.

In operation, the pivotable plate 59 is normally in the horizontal position and as each roller unit 30 passes around the sprocket 5, the arm 31 pivots by gravity to the lower position so that the roller 37 will travel through the by-pass pit extension 49 beneath the plate 50. At the end of the pit extension 49, the rollers 37 will ride up the inclined plate 58 and back onto the upper surface of the foundation 2.

The owner or operator of the vehicle will drive the vehicle onto the conveyor system so that the front tire 38 of the vehicle is positioned on the plate 50 between the openings 52 and 53. The attendant will then vacuum the interior of the vehicle and during this period the rollers 37 will travel in the by-pass path beneath the plate 50.

When the attendant desires to have the vehicle move through the washing unit, he actuates the control for the valve unit connected to the cylinder 63 to thereby introduce air into the line 69 to move the plate 59 to the inclined position. The roller 37 of the next roller unit 30, traveling around the sprocket 5, will then ride up the inclined plate 59 and through the opening 52 and onto the upper surface of plate 50. The roller 37 will then engage the tire 38 and move the vehicle through the washing unit.

When the vehicle has proceeded beyond the plate 50, the front end of the vehicle will actuate the limit switch 71 which is operably connected to the valve unit, to introduce fluid into the upper end of the cylinder 63 through line 68 to return the plate 59 to its horizontal position. The next roller unit 30, moving around the sprocket 5, will travel in the by-pass path beneath the plate 50.

The mechanism of the invention provides an automatic by-pass for the roller units 30 so that they will not engage the vehicle tire 38 which is located on the conveyor. When it is desired to move the vehicle through the washing system, the attendant merely actuates the fluid cylinder 63 to elevate plate 59, causing the next succeeding roller unit 30 to move to the upper elevation to engage the tire.

With this system, the owner or operator of the car can drive the vehicle directly onto the conveyor and the attendant does not have to get into the car and drive it onto the conveyor. This not only saves considerable time, but also eliminates customer aggravation due to the fact that many customers are reluctant to have attendants drive their vehicles.

The conveying system is also less costly than many conventional types in that the conveyor chain travels above grade in both the conveying and return paths of travel. This eliminates the necessity of forming a trough in the foundation for the return path of travel as is necessary in systems where the conveying path and return path are located in a vertical plane.

In some instances it may be preferred to have the roller 37 engage the rear vehicle tire rather than the front tire. In this case, the length of plate 50 is extended so that both the front and rear tires can be positioned between the doors 54 and 55.

While the invention is directed specifically to a vehicle washing unit, it is contemplated that the conveyor can be used in other applications where articles are to be conveyed by a conveyor.

Various modes of carrying out the invention are contemplated as being within the scope of the following claims particularly pointing out and distinctly claiming the subject matter which is regarded as the invention.

I claim:

1. A conveyor system for a vehicle washing unit, comprising a foundation, an endless conveyor chain mounted for travel on the foundation and disposed to travel in a horizontal plane, an entry station located adjacent one end of the path of travel of said conveyor chain, a series of roller units attached at spaced intervals to the conveyor chain, each roller unit being pivotally connected to the chain about a horizontal axis whereby the roller unit can pivot in a vertical plane, each of said roller units including arm means pivotally connected to the chain and a guide roller journalled for rotation on the end of said arm means and disposed to ride on the foundation, each of said roller units also including a main roller journalled on said arm means and located between the guide roller and the pivotal connection of said arm means to said conveyor chain, said main roller disposed to engage the vehicle tire when the guide roller is riding on the foundation to thereby convey the vehicle through the washing unit, said roller unit also including means for spacing the main roller above the foundation when said guide roller is riding on said foundation, passage means formed in the foundation beneath the entry station, and bypass means for selectively diverting the roller units through said passage means and beneath said entry station whereby the main roller will not engage the vehicle tire located at said entry station.

2. The system of claim 1, wherein said arm means includes an arm pivotally connected to the conveyor chain, and said main roller is journalled on said arm, said arm means also includes a link disposed at an angle to said arm, said guide, roller being journalled on said link.

3. The system of claim 1, and including a guide track to guide the conveyor chain in travel.

4. The system of claim 3, wherein the guide track is an I-beam having a central vertical web, said conveyor chain traveling on one side of said web during travel in one direction and traveling on the other side of the web during travel in the opposite direction.

5. The system of claim 4, and including wear means extending vertically from the conveyor chain and disposed to ride against said guide track to prvent wear of said chain.

6. The system of claim 1, and including a series of driven rollers disposed transversely of the path of travel of the conveyor chain, the periphery of said driven rollers extending slightly above the foundation in position to be engaged by the vehicle tire to thereby spin the vehicle tire, and guide means disposed to be engaged by the roller unit to move the roller unit to an elevated position above said driven rollers so that said roller unit will not contact said driven rollers.

7. The system of claim 6, wherein said guide means includes a fixed guide member located above said driven rollers and disposed to be engaged by said roller unit to elevate said roller unit.

8. A conveyor system for a vehicle washing unit, comprising a foundation having a pit therein, a guide track mounted on the foundation adjacent the pit, an endless conveyor mounted for movement on the track and having a path of travel extending from an entry station to a discharge station, a series of conveying units attached at spaced locations to the conveyor, each conveying unit including an arm pivotally connected to the conveyor about a horizontal axis, and having a conveying member attached to said arm, a plate mounted on the foundation and partially covering said pit with the edge of said plate being spaced from the track to provide a clearance therebetween, said arm being disposed in vertical alignment with the clearance, each conveying unit being pivotable about said axis from an upper conveying position, in which the conveying member is located above the foundation and is adapted to engage the tire of a vehicle located at the entry station to convey the vehicle to the discharge station, to a lower bypass position in which the arm extends downwardly through said clearance and said conveying member is located beneath the level of the foundation, said plate being provided with a pair of spaced openings located in alignment with said path of travel, a first of said openings being located adjacent the entry station and the second of said openings being located downstream in the direction of vehicle movement from said first opening, means for biasing each conveying unit to said lower position as the conveying unit approaches the entry station so that the conveying member travels beneath the plate to by-pass the vehicle tire located on the plate between said openings, means disposed adjacent said second opening for moving said conveying unit from the lower to the upper position with said conveying member passing through the second opening and onto the foundation, and means located adjacent the first opening for selectively moving said conveying unit from the lower position to the upper position with the conveying member passing through said first opening and onto said plate, whereby the conveying member will then engage the vehicle tire and convey the vehicle to the discharge station.

9. The system of claim 8, wherein said last named means comprises a ramp located beneath said first opening, and operating means for pivoting said ramp between a generally horizontal position and an inclined position, said conveying member disposed to ride up the inclined ramp and through the first opening.

10. The system of claim 9, wherein said operating means is a fluid cylinder connected to said ramp.

11. The system of claim 12, and including a hinged door enclosing each of said openings, said doors being biased to the closed position and being disposed to be pivoted to the open position by the conveying member.

12. The system of claim 9, and including means responsive to the vehicle tire being moved by the conveying member to a position downstream of said second opening for actuating said operating means and pivoting said ramp from the inclined to the horizontal position.

13. The system of claim 8, and including guide means connected to the guide track and disposed to be engaged by the conveying unit to move the conveying unit to a third elevated position above said conveying position.

14. A conveyor system for a vehicle washing unit, comprising a foundation, an endless conveyor chain mounted for travel on the foundation and disposed to travel in a horizontal plane, an entry station located adjacent one end of the path of travel of said conveyor, a series of roller units attached at spaced intervals to said conveyor chain, each roller unit being pivotally connected to the conveyor chain about a horizontal axis whereby the roller unit can pivot in a vertical plane, passage means formed in the foundation beneath the entry station, bypass means for selectively diverting the roller units through said passage means and beneath said entry station whereby the roller units will not engage the vehicle tire located at said entry station, each roller unit including an arm pivotally connected to the conveyor chain and also including a main roller journalled for rotation on said arm and disposed to engage the vehicle tire, and means on said conveyor chain for preventing lateral deflection of the outer end of the arm when the main roller is disposed in engagement with the vehicle tire.

* * * * *